Sept. 3, 1963
H. E. CLARY
3,102,488
PRESSURE CONTROL DEVICE
Filed Dec. 12, 1960
3 Sheets-Sheet 1
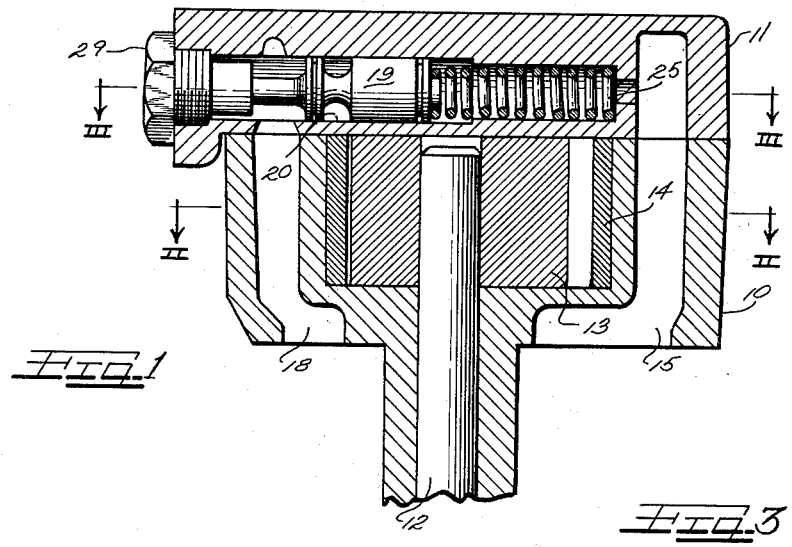
Fig.1
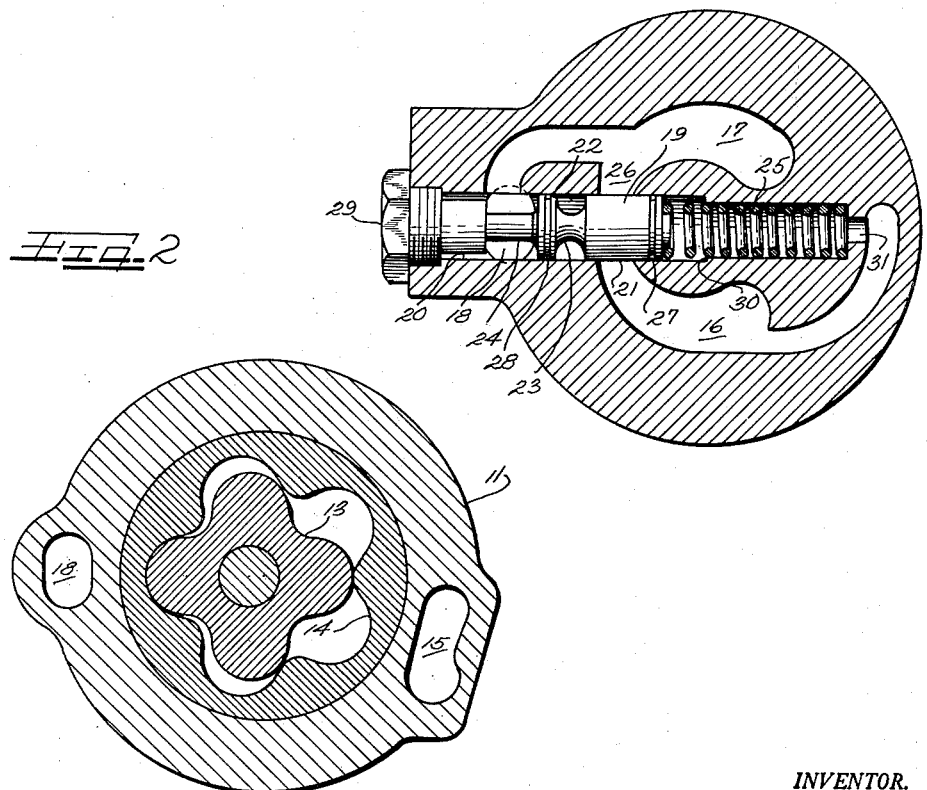
Fig.2
Fig.3
INVENTOR.
Harry E. Clary
BY
*Hill, Sherman, Meroni, Gross & Simpson*
ATTORNEYS Sept. 3, 1963  H. E. CLARY  3,102,488
PRESSURE CONTROL DEVICE
Filed Dec. 12, 1960  3 Sheets-Sheet 2
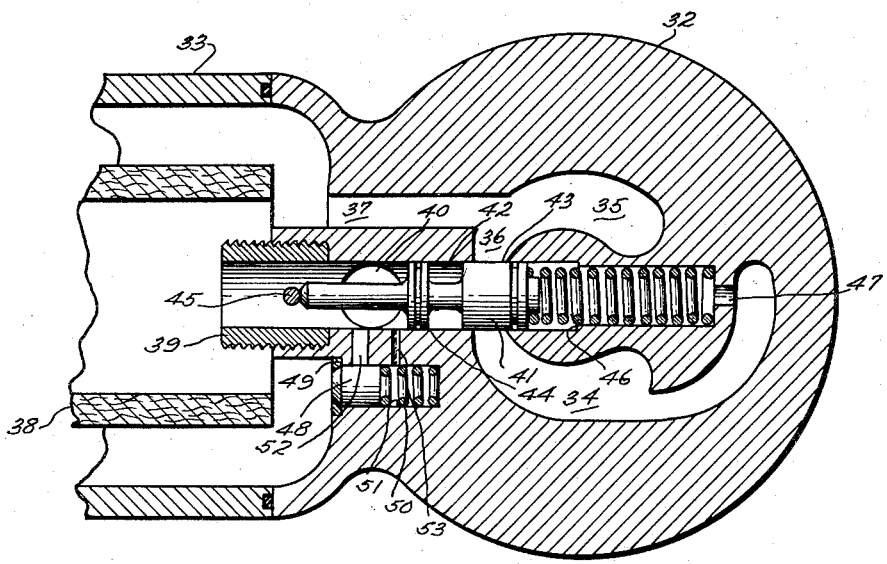
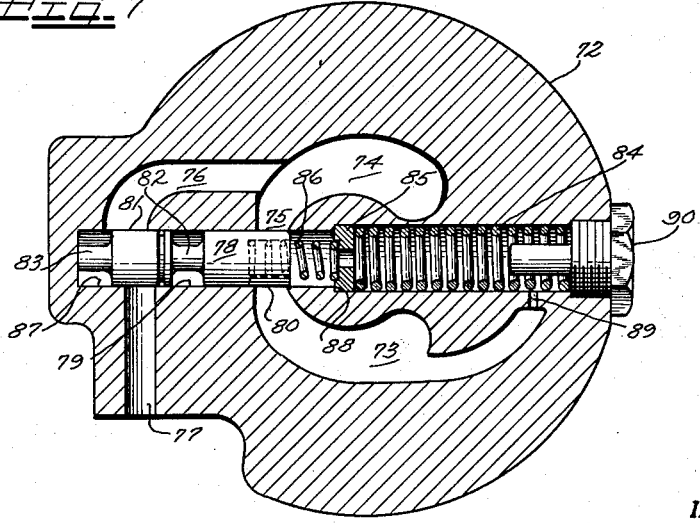
INVENTOR.
Harry E. Clary
BY
ATTORNEYS Sept. 3, 1963
H. E. CLARY
3,102,488
PRESSURE CONTROL DEVICE
Filed Dec. 12, 1960
3 Sheets-Sheet 3
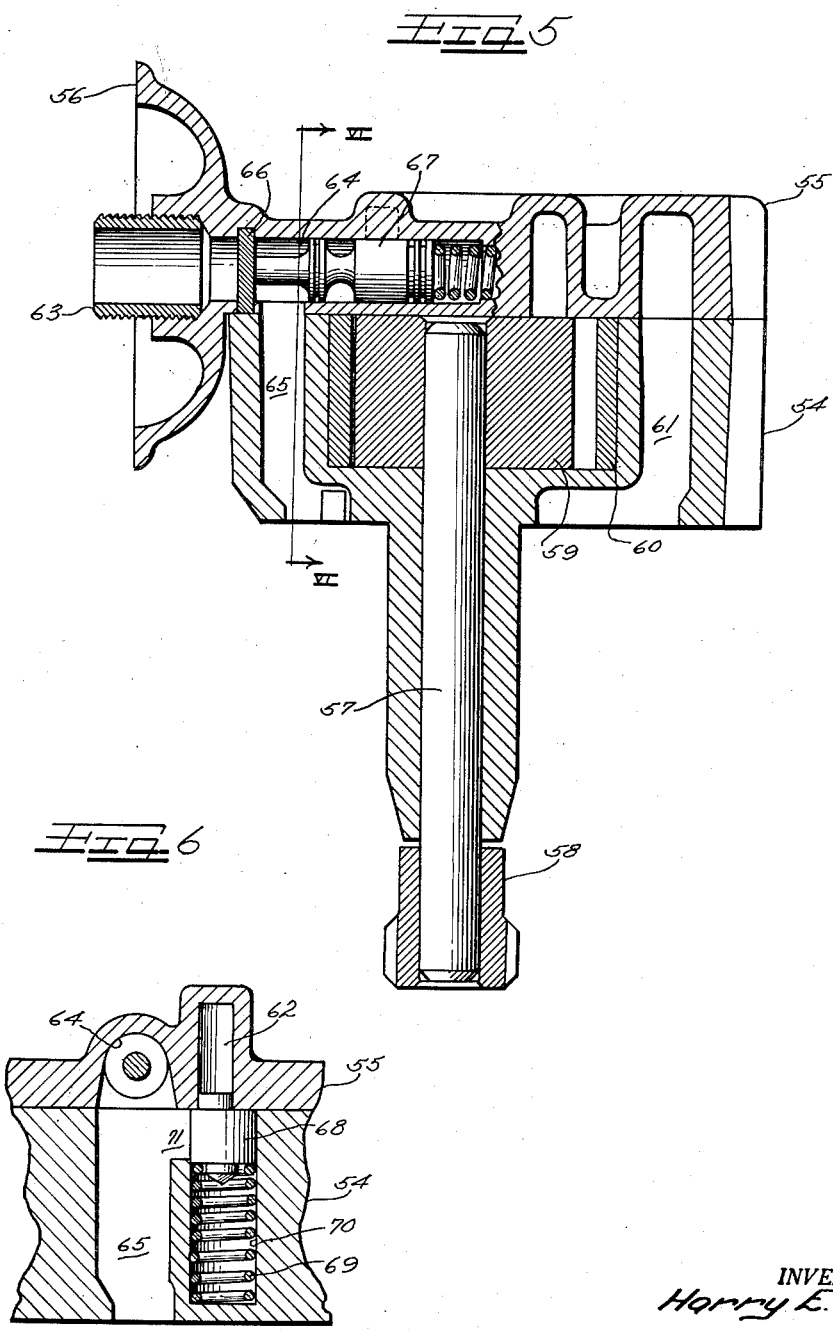
INVENTOR.
Harry E. Clary
BY
ATTORNEYS

United States Patent Office 3,102,488
Patented Sept. 3, 1963

3,102,488
PRESSURE CONTROL DEVICE
Harry E. Clary, Chesterland, Ohio, assignor to Thompson Ramo Wooldridge Inc., Cleveland, Ohio, a corporation of Ohio
Filed Dec. 12, 1960, Ser. No. 75,266
5 Claims. (Cl. 103—42)

This invention relates to pressure control devices and, more particularly, to means for controlling the fluid pressure at the output of a fluid pump by returning a portion of the pump output to the pump input.

Numerous operations require a source of fluid at a relatively constant pressure. One such source that has been used is a pressure relief valve that is connected to the output of a pressure source such as a pump. Such devices have been deficient in the past, however, in that there is a flow of fluid past the portion of the valve that senses the control pressure. This is disadvantageous because this fluid flow requires that the control pressure be higher than the desired value in order to maintain the valve in the open position.

A second disadvantage in valve devices that control the pressure by by-passing a portion of the fluid from the high pressure to the low pressure side of a pump is the fact that the pressurized fluid that controls the amount of fluid being by-passed mingles with the by-passed fluid. Therefore, two different types of fluid cannot be used.

Accordingly, it is an object of this invention to provide an apparatus for controlling fluid pressure in a system by returning a portion of the fluid output from a pressure source to the input of the pressure source which does not possess these disadvantages.

It is another object of this invention to provide a pressure control device of the type described wherein the pressure is maintained nearly constant regardless of the rate at which the fluid is by-passed.

It is another object of this invention to provide a pressure control device wherein there is no fluid flow past the portion of the valve that senses the control pressure when the valve is in the open position.

It is another object of this invention to provide a pressure control device of the type described wherein the pressurized fluid that controls the position of the valve does not mingle with the fluid being by-passed.

Other objects, features and advantages of the present invention will be apparent from the following detailed description taken in conjunction with the accompanying figures of the drawings, in which:

FIGURE 1 is a view in cross-section of an apparatus constructed in accordance with the invention for providing fluid at a constant pressure;

FIGURE 2 is a view taken along the line II—II of FIGURE 1;

FIGURE 3 is a view taken along the line III—III of FIGURE 1;

FIGURE 4 is a view in cross-section of another embodiment of the invention which includes a fluid filtering device;

FIGURE 5 is a view in cross-section of another embodiment of the invention having a fluid filtering device;

FIGURE 6 is a view taken along the line VI—VI of FIGURE 5; and

FIGURE 7 is a view in cross-section of an apparatus constructed in accordance with another embodiment of the invention for providing fluid at a constant pressure and having means for closing off the pump discharge port.

As shown on the drawings:

With reference to the embodiment of the invention illustrated in FIGURES 1, 2 and 3, the apparatus includes a pump body 10, a cover 11, and a drive shaft 12 that is journaled in the body 10. Mounted on the shaft 12 is a pinion gear 13 that mates with a ring gear 14 to form a gear-rotary pump. Both of the gears 13 and 14 are rotatably mounted and power is applied to the shaft 12 and pinion gear 13. In the operation of the pump, an inlet opening 15 formed in the pump body 10 is coupled to a source of fluid and fluid flows to an inlet kidney 16 formed in the cover above the pinion gear 13. This inlet kidney 16 is positioned above the point at which the two gears 13 and 14 are coming out of mesh so that the fluid fills the spaces between these two gears. Above the area in which the two gears are coming into engagement is formed a discharge kidney 17 which receives the fluid discharge from the pump. The discharge kidney 17 is coupled to an outlet port 18 formed in the body 10, the port 18 being adapted to be coupled to a receiver for the pressurized fluid.

Also mounted in the cover 11 is a valve that controls the flow of the fluid. This valve includes a spool 19 that is positioned in a spool bore 20. This spool 19 includes two lands 21 and 22 and two undercut portions 23 and 24. A compression spring 25 is positioned in the spool bore 20 behind the spool 19 and urges the spool 19 toward the left as seen in FIGURE 3. At the position illustrated the land 21 closes a by-pass port 26 formed in the cover 11 between the inlet kidney 16 and the discharge kidney 17.

In the operation of the device, the fluid enters the pump through the inlet port 15 and flows into the inlet kidney 16 where it is pumped to a higher pressure and is discharged to the kidney 17. The high pressure fluid normally flows from the kidney 17 to the discharge port 18 since the land 21 normally closes the by-pass port 26. However, when the pressure at the outlet port 18 increases to a predetermined value, the fluid exerts a pressure on the area presented by the land 22 and forces the spool 19 toward the right as seen in FIGURE 3 until the undercut portion 23 meets the by-pass port 26 and permits a portion of the fluid to circulate from the discharge kidney 17 to the inlet kidney 16. It can be seen that the position of the spool 19 and the amount of fluid being by-passed is determined by the pressure at the outlet port 18 and the strength of the spring 25, and it is apparent that the magnitude of the outlet pressure can be adjusted by a proper choice of the spring 25.

Labyrinth grooves 27 and 28 are formed in the lands 21 and 22, respectively, to limit the flow of fluid past these lands. The movement of the valve spool 19 toward the left as seen in FIGURE 3 is limited by a retaining nut 29 and the movement of the spool 19 toward the right is limited by a reduced diameter section of the spool bore 20 which begins at 30.

An orifice 31 is formed in the cover 11 which places the spool bore 20 in communication with the inlet kidney 16 so that the space between the spool 19 and the orifice 31 fills with fluid. Any tendency for the valve spool to oscillate rapidly, due to pressure disturbances in the system, can be substantially reduced or eliminated by properly sizing the orifice 31. Any movement of the valve spool 19 causes fluid to flow through the orifice 31 and the resistance to flow through this orifice acts as a dampening force.

It can be seen that the apparatus illustrated in FIGURES 1, 2 and 3 is an effective source of fluid at a constant pressure. Any increase in the fluid pressure at the outlet port 18 in excess of a desired amount will cause the valve spool 19 to move toward the right and permit a portion of the fluid to circulate through the by-pass port 26. Since the fluid being by-passed does not flow past the land 22 which senses the control pressure there will not be a pressure change when the rate of flow changes. Also, the fluid being by-passed does not mingle with the fluid at the point where the pressure is being sensed so that the apparatus is capable of being controlled from a remote point.

The embodiments of the invention illustrated in FIGURES 4, 5 and 6 are especially adapted for use with a fluid filter. The apparatus illustrated in FIGURE 4 includes a cover 32 that is fastened to a filter container 33. An inlet kidney 34, a discharge kidney 35, and a by-pass port 36 are formed in the cover 32 in the manner previously described. The discharge kidney 35 is connected by a way of a passageway 37 to the interior of a filter container 33.

Positioned within the filter container 33 is a filter element 38 that surrounds a hollow insert 39 threaded into the cover 32. The hollow insert 39 forms a fluid passageway that leads to a discharge outlet 40 formed in the cover 32.

A spool 41 is positioned in a spool bore 42 formed in the housing 32, and a land 43 formed on the spool controls the flow of fluid through the by-pass port 36. As in the previous embodiment, when the pressure at the outlet 40 increases above a predetermined value the fluid pressure exerted on the area presented by the land 44 forces a spool 41 toward the right as seen in FIGURE 4 until the land 41 opens a portion of the by-pass port 46 and permits a portion of the fluid to circulate from the discharge kidney 35 to the inlet kidney 34. A pin 45 fastened to the insert 39 limits the movement of the spool 41 toward the left as seen in FIGURE 4, and a reduced diameter section of the spool bore 42 which begins at 46 limits the movement of a spool 41 toward the right.

An orifice 47 is again formed in the cover 32 which permits the fluid to fill the spool bore 42 behind the top spool 41 and dampen oscillations.

In the operation of the apparatus, fluid flows from the discharge kidney 35, through the passageway 37 into the interior of the filter container 33. The fluid then flows through the element 38 where it is filtered and re-enters the cover 32 through the insert 39. If the pressure at the discharge outlet 40 again increases above a predetermined value the fluid pressure on the area presented by the land 44 forces the spool 41 toward the right which permits a portion of the fluid to circulate from the discharge kidney 35 to the inlet kidney 34.

A filter by-pass is also provided which acts as a safety device in the event the filter element 38 becomes partially blocked. The filter by-pass device includes a piston 48 that is spring loaded in a closed position against a seal 49 by a compression spring 50. The piston 48 and spring 50 are positioned in a bore 51 formed in the cover 32. Two passageways 52 and 53 are also formed in the cover 32 which place the bore 51 in communication with the spool bore 42.

When the pressure drop through the filter element 38 increases to a predetermined value, a piston 48 is forced to the open position and fluid flows from the interior of the container 33 through the passageway 52 to the outlet 40. The passageway 53 formed in the cover 32 behind the piston 48 permits the fluid to flow out of the bore 51 as it is displaced by the piston 48. Since the fluid pressure is sensed at a point downstream of the filter element 38, the valve is able to maintain the desired pressure at the pump discharge even though a portion of the fluid is by-passed around the filter element 38.

The embodiment of the invention illustrated in FIGURES 5 and 6 also includes a body 54 and a cover 55 which is adapted to be attached to a filter container at 56. The device is equipped with a drive shaft 57 that is fastened to a drive gear 58 and a pinion gear 59 which cooperates with a ring gear 60 to cause the pumping action previously described. The normal flow of the fluid through the pump is from an inlet opening 61, through a passageway 62, as seen in FIGURE 6, which leads to the interior of the filter container 56. After the fluid passes through a filter element (not shown) it reenters the pump through a hollow insert 63, flows along a passageway 64, FIGURES 5 and 6, and leaves the pump by way of a fluid outlet 65. A pin 66 is fastened to the interior of the passageway 64 and acts as a stop for the spool 67.

The filter by-pass device is constructed in the body 54 and includes a piston 68 and a spring 69 which are positioned in a bore 70. The wall of the bore 70 is cut-away at 71 so that when the piston 68 is forced downwardly by fluid pressure within the passageway 62, the fluid in the passageway 62 is able to flow through the bore 70 and the opening 71 into the outlet 65, thereby by-passing the filter element.

The embodiment of the invention illustrated in FIGURE 7 is designed to close off the pump discharge port when the pump is not delivering fluid to the system. This embodiment includes a cover 72 that has an inlet kidney 73 and an outlet or discharge kidney 74 formed in it. A by-pass port 75 is provided between the inlet and discharge kidneys and a discharge passageway 76 is formed between the discharge kidney 74 and an outlet port 77.

A spool 78 is disposed in a spool bore 79 formed in the cover 72 which has two lands 80 and 81 and two undercut portions 82 and 83 formed on it. Also positioned within the spool bore 79 is a pressure control spring 84, a retainer 85, and an auxiliary spring 86.

When the pump is inoperative the spool 78 is in the position shown in FIGURE 7 where the land 80 blocks the by-pass port 75 and the land 81 blocks the discharge passageway 76. As the pump begins to operate and pressure builds up in the discharge kidney 74 and the discharge passageway 76, fluid in the section 87 of the bore 79 at the left end of the spool 78 exerts a force on the face of the land 81 which causes the auxiliary spring 86 to compress until the end of the spool 78 meets the retainer 85. At this point the land 81 opens the discharge passageway 76 and the fluid discharges from the discharge kidney 74 to the outlet port 77. The land 80 is wide enough so that the by-pass port 75 is still blocked when the spool 78 is in this position. When the pressure in the discharge passageway 76 increases to the point where a portion of the fluid should be by-passed, the force of the fluid on the face of the land 81 compresses the control spring 84 until the land 80 opens a portion of the by-pass port 75. As was the case with the previous embodiments of the invention, as the outlet pressure tends to increase more fluid is by-passed in order to maintain a constant pressure. As soon as the pump is turned off, the pressure against the face of the land 81 subsides and the control spring 84 forces the spool 78 toward the left as seen in FIGURE 7 and the land 81 again closes the discharge passageway 76. Therefore, the fluid in the line connected to the outlet port 77 cannot leak back into the pump.

The construction of the body for the device illustrated in FIGURE 7 may be identical with the others illustrated with the exception that the discharge outlet is eliminated. The discharged outlet is formed in the cover 72 instead as can be seen in FIGURE 7.

The retainer 85 abuts an undercut portion of the spool bore 79 that begins at 88 so that the control spring 84 cannot compress the auxiliary spring 86 beyond a predetermined amount. Normally the force exerted by the auxiliary spring 86 is considerably less than the force exerted by the main control spring 84 since the auxiliary spring 86 is only required to stroke the spool 78 to the closed position where it blocks the discharge passageway 76.

A dampening effect is again provided by an orifice 89 that is formed in the cover 72 between the inlet kidney 73 and the interior of the spool bore 79 and which allows fluid to fill the space between the spool 78 and a retaining nut 90.

It will be apparent that many modifications and variations may be effected without departing from the scope of the novel concepts of the present invention.

I claim as my invention:

1. A pump comprising a casing having a pumping chamber, rotary displacement means in said casing having side faces, and rotatable in said pumping chamber, and a cover having a wall extending across one end of said pumping chamber adjacent one of said side faces of the rotary displacement means, said cover at said wall having formed therein first and second recesses spaced apart from one another to form an inlet recess and an outlet recess and communicating with said pumping chamber, a valve bore formed in said cover and having a portion thereof disposed between said first and second recesses to form a by-pass port extending between said recesses, and directing the by-pass flow across the valve bore in a direction generally normal to the valve bore axis, a valve spool in said bore having two axially spaced lands, one of which controls said by-pass port, the other of which forms a valve motive surface, said outlet recess having an outlet port extending in spaced relation away from said by-pass port in the general direction of one end of said valve bore and, passage means connected to said outlet port and communicating pump-generated outlet pressure to said valve bore to act on said motive surface and in a direction generally normal to the valve bore axis but spaced from said by-pass port, thereby to prevent fluid being by-passed from mingling with fluid acting on said motive surface of said valve spool.

2. A pump as defined in claim 1, further provided with a filter container connected to said outlet port, a filter element in said container through which pump discharge passes, and said passage means formed as a fluid passageway extending from a point downstream of said filter element to said valve bore.

3. A pump as defined in claim 2, further provided with a filter by-pass valve between said filter container and said valve bore on the discharge side of said other land to by-pass the filter in the event the filter element becomes blocked.

4. A pump as defined in claim 1 further characterized by said outlet port being formed with an outlet passage traversed by said other land, said other land of said valve spool having an axial length sufficient to close said outlet passage when the pump is inoperative.

5. A pump as defined in claim 1, said inlet recess having a passage extending to the end of said valve bore opposite said outlet port to damp oscillations of the valve spool.

References Cited in the file of this patent

UNITED STATES PATENTS

| | | |
|---|---|---|
| 2,107,152 | Huber | Feb. 1, 1938 |
| 2,665,637 | Lauck | Jan. 12, 1954 |
| 2,739,538 | Witchger | Mar. 27, 1956 |
| 2,751,847 | Erickson | June 26, 1956 |
| 2,752,853 | Eames | July 3, 1956 |
| 2,775,206 | Connelly | Dec. 25, 1956 |
| 2,781,726 | Bangs | Feb. 19, 1957 |
| 2,812,715 | Redding et al. | Nov. 12, 1957 |
| 2,813,488 | Deska | Nov. 19, 1957 |
| 2,845,868 | Norlin | Aug. 5, 1958 |
| 2,858,766 | Toschkoff | Nov. 4, 1958 |
| 2,883,934 | Roosa | Apr. 28, 1959 |
| 2,918,013 | Eames | Dec. 22, 1959 |
| 2,966,118 | McAlvay | Dec. 27, 1960 |
| 2,977,888 | Livermore | Apr. 4, 1961 |
| 3,003,423 | Drutchas | Oct. 10, 1961 |
| 3,009,420 | Livermore et al. | Nov. 21, 1961 |

FOREIGN PATENTS

| | | |
|---|---|---|
| 201,576 | Australia | Apr. 20, 1956 |
| 730,490 | Great Britain | May 25, 1955 |